(12) United States Patent
Quinta Gaspar et al.

(10) Patent No.: US 11,112,682 B1
(45) Date of Patent: Sep. 7, 2021

(54) COMPACT STAND FOR A TELEVISION CAMERA

(71) Applicant: OmniCam4Sky, Lda., Venda do Pinheiro (PT)

(72) Inventors: Jorge Manuel Quinta Gaspar, Venda do Pinheiro (PT); Paulo José Nunes Guerreiro, Venda do Pinheiro (PT)

(73) Assignee: OmniCam4Sky, Lda., Venda do Pinheiro (PT)

( * ) Notice: Subject to any disclaimer, the term of this patent is extended or adjusted under 35 U.S.C. 154(b) by 0 days.

(21) Appl. No.: 16/905,916

(22) Filed: Jun. 19, 2020

(51) Int. Cl.
*H04M 1/12* (2006.01)
*G03B 17/56* (2021.01)
*F16M 11/38* (2006.01)
*F16M 11/08* (2006.01)

(52) U.S. Cl.
CPC ............ *G03B 17/561* (2013.01); *F16M 11/08* (2013.01); *F16M 11/38* (2013.01); *F16M 2200/066* (2013.01)

(58) Field of Classification Search
USPC ......................................................... 396/428
See application file for complete search history.

(56) References Cited

U.S. PATENT DOCUMENTS

| | | | | |
|---|---|---|---|---|
| 4,094,484 A | * | 6/1978 | Galione | B66F 3/24 248/162.1 |
| 2003/0161622 A1 | * | 8/2003 | Zantos | F16M 11/18 396/419 |

* cited by examiner

*Primary Examiner* — Clayton E. LaBalle
*Assistant Examiner* — Warren K Fenwick
(74) *Attorney, Agent, or Firm* — Mark M. Friedman

(57) ABSTRACT

A stand in which professional television cameras are placed includes a compact and easily storable and transportable stand for professional television cameras comprising a plurality of supporting legs pivotable upon the fixed base, and between a folded position, in which the stand is positioned coupled to a corresponding slot, and an open position, in which the stand is positioned substantially in parallel to the fixed base and thereby able to be placed on a surface. When the stand is in storage or transport, the stand may be brought into a folded position, in which each supporting leg is coupled to a corresponding slot, reducing the form factor of the stand while folded and having higher easiness in transportation.

16 Claims, 2 Drawing Sheets

COMPACT STAND FOR A TELEVISION CAMERA

FIELD OF THE INVENTION

The present invention is enclosed in the area of accessories for television cameras, typically referred as professional television cameras, and used for the transmission of events with particular movement, such as sports or music events—usually live—, particularly referring to the stand in which such professional television cameras are placed.

PRIOR ART

In solutions known in the art, the stands for a professional television camera typically contain a central plate, in which a column is fixed, a television camera being connectable to the column. Furthermore, an arm with a seat is rotatable around the column. Thus, prior art solutions provide for the rotation of the television camera operator, seated on the seat, around the column, as well as the rotation of the camera around the same axis.

With regard to the support of the stand on the surface, it may be provided by a fixed plate or fixed set of legs, such as the case of patent application WO0079178, or provided by a set of movable legs, which are connected to the central plate and rotatable with regard to it, providing a fold-up arrangement in which the stand can be stored and transported.

However, when considering the supporting legs, the existing solutions consist of a simplified aggregation of pivotable elements, which do not provide a compact and easily storable and transportable stand.

The present solution innovatively overcomes such issues.

SUMMARY OF THE INVENTION

It is an object of the present invention a compact stand for a television camera such as a professional television camera, which comprises:
- a fixed base with a plurality of slots peripherally provided,
- a column suitable for connecting a television camera, such that the camera is therein rotatable around an axis of the column,
- an arm suitable for fixing a seat for a television camera operator and rotatable around the axis of the column, and
- a plurality of supporting legs, each being pivotable upon the fixed base, wherein each supporting leg is pivotable between:
  i. a folded position, in which it is positioned so that it is able to be coupled to a corresponding slot, and
  ii. an open position, in which it is positioned substantially in parallel to the fixed base and thereby able to be placed on a surface.

The compact stand therefore provides for a better coupling of the supporting legs to the fixed base which acts as the reference element of the stand by allowing that the supporting legs are brought into an open position when the stand is in operation, i.e., placed on a surface, with a television camera connected to the column and television camera operator seated in a set connected to the arm. When the stand is not in operation, for instance for its storage or transport, it may be brought into a folded position, in which each supporting leg is coupled to a corresponding slot, therefore reducing the form factor of the stand while folded and having higher easiness in transportation.

Regarding each supporting leg, the referred pivoting movement that the pivoting axis of each supporting leg is such that the supporting leg is aligned with the corresponding slot, therein being coupled.

Typically, the fixed base is flat, comprising a plate which, most often, is rounded. With regard to the several elements which the stand of the present invention comprises, they may be connected by varied forms known in the art, such as bolts, nuts and/or pivots, or others. Advantageously, the supporting legs are independently movable between each other, that meaning that a supporting leg can be pivoted from an open position to a folded position independently of the position of any of the other supporting legs.

As shown in FIGS. 1 and 2, the axis of the column is longitudinal, therein being substantially perpendicular to the fixed plate and, thus, to the ground.

In an inventive aspect of the stand of the present invention, it further comprises blocking means suitable for blocking each of the supporting legs in the folded and/or in the open position, the blocking means being connected to the fixed base and pivotable between:
- a blocking position, in which the blocking means prevent the pivotable movement of the supporting legs,
- a released position, in which the supporting legs are able to perform the referred pivotable movement.

The blocking means allow higher stability of the stand when brought into one of the two positions, as the blocking position of the blocking means prevent the pivotable movement of the supporting legs. A released position of the blocking means allows to again release the supporting legs.

Advantageously, the blocking means comprise a set of blocking elements, each blocking element corresponding to a slot and a supporting leg, each blocking element being such that it pivots around an axis perpendicular to the pivoting axis of the corresponding supporting leg and provides the blocking of the corresponding supporting leg in the corresponding folded position or open position and, preferably, the blocking elements are connected to each other so that they are jointly movable. The blocking elements provide for blocking of each supporting leg. The blocking is provided independently by each of such elements.

In another inventive aspect of the stand, each supporting leg comprises a proximal section and a distal section, the two sections being pivotably connected such that, upon placement of the supporting legs on a surface in the open position, the angle between each distal section and corresponding proximal section is adaptable, providing regulation of the distance between the proximal section and the surface. Preferably, in such situation, each of the blocking elements is in a blocked position.

The stand of the present invention may form a transport kit, together with a suitable case, the stand being brought into folded position and put into the case. A case may have dimensions which allow to store more than one stand. A case has wheels and a handle, thereby improving transportability of the transport kit. Such advantages are also obtained by the high compactness of the stand of the present invention.

DETAILED DESCRIPTION

Figure 1:
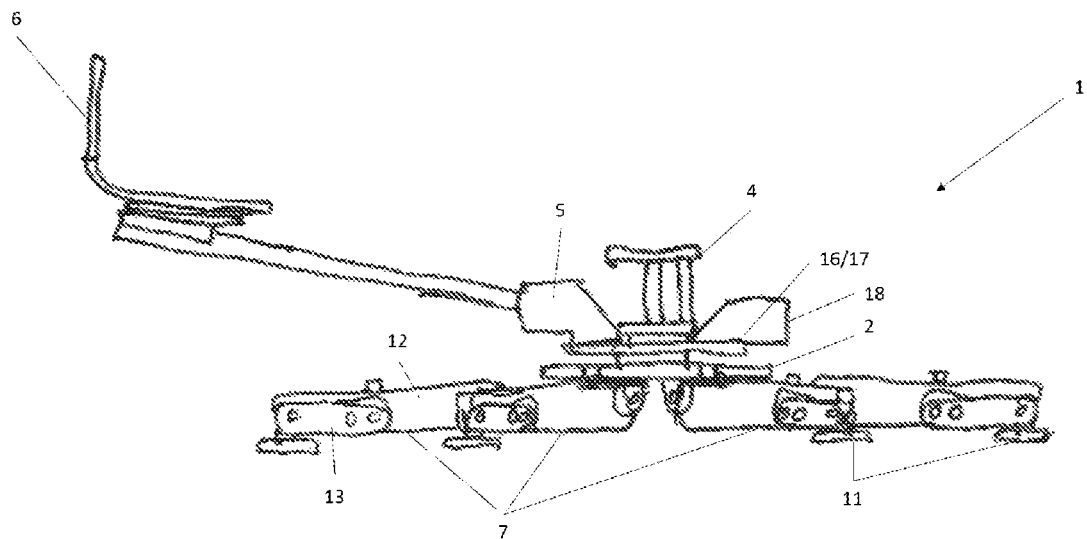
FIG. 1—side view of a representation of an embodiment of the stand (1) of the present invention in an open position.

The more general and advantageous configurations of the present invention are described in the Summary of the invention. Such configurations are detailed below in accordance with other advantageous and/or preferred embodiments of implementation of the present invention.

In a preferred embodiment of the stand of the present invention, each supporting leg (7) comprises a cut-out, such cut-out being so arranged that, when such supporting leg (7) is in a folded position, provides for the coupling of the corresponding blocking element, when such blocking element is in a blocking position. In an example of such cut, the blocking elements (9) are in blocking position and coupled to such cut-out of the supporting legs (7). The supporting legs (7) are therefore steadily blocked in the folding position.

Moreover, in a further embodiment, each supporting leg (7) is so arranged in relation to the fixed base (2) that, when in an open position, the corresponding blocking element, when pivoted into a blocking position, is between such supporting leg (7) and the corresponding slot (3). The supporting legs (7) are therefore steadily blocked in the open position.

Figure 2:
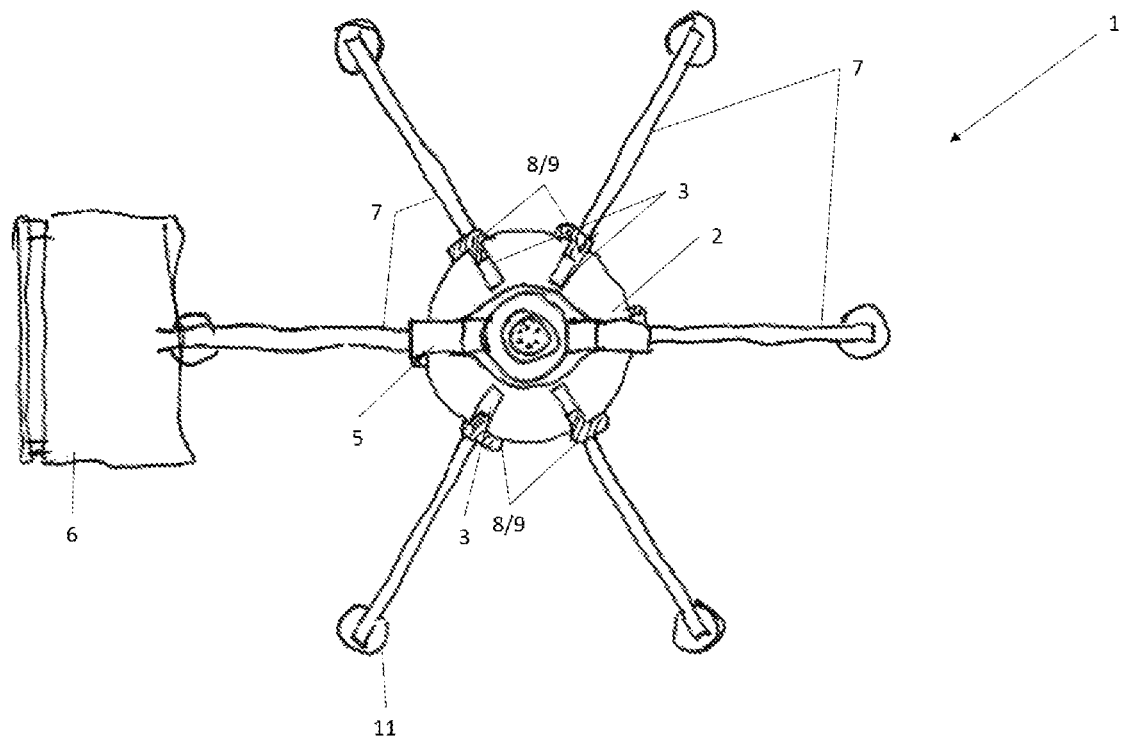
FIG. 2—top view of a representation of an embodiment of the stand (1) of the present invention in an open position.
Figure 3:
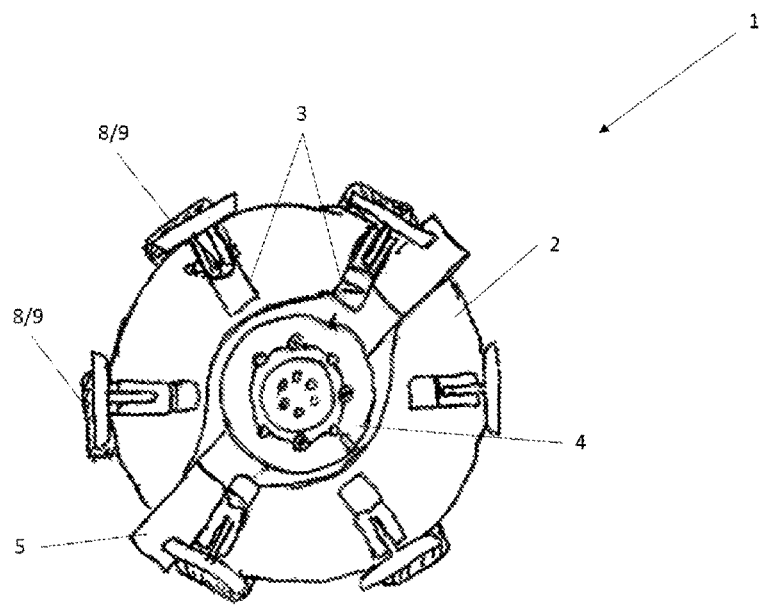
FIG. 3—top view of a representation of an embodiment of the stand (1) of the present invention in an unfolded position.
Figure 4:
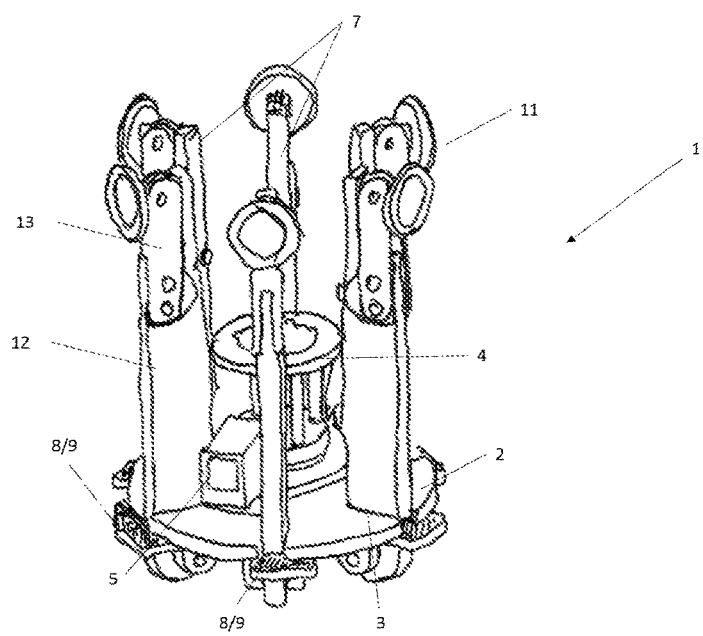
FIG. 4—perspective view of a representation of an embodiment of the stand (1) of the present invention in an unfolded position.
Figure 5A:
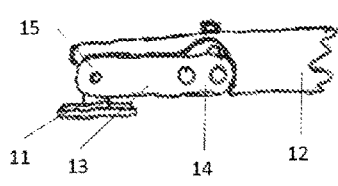
FIG. 5a—side view of a representation of an embodiment of a supporting leg (7) of the stand of the present invention, with the proximal section (12) and the distal section (13), the distal section (13) having a first end (14) pivoted in an end the proximal section (12), and a second end (15) pivoted in an intermediate point of the proximal section (12), and a foot (11) being pivotably connected to said first end (14) of the distal section (13). In such case, the ground is relatively even, with no particular need for height regulation and adaptation of the supporting legs (7).
Figure 5B:
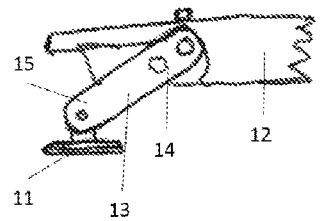
FIG. 5b—side view of the representation of FIG. 5a, in such case the ground being uneven, and thereby the distal section (13) pivoting in the proximal section (12) such that the first end (14) of the distal section (13) is further away from the proximal section (12) than in the situation of FIG. 5a. Moreover, the corresponding foot (11) also pivots in the first end (14) such that it lays on the ground. The supporting leg (7) thereby provides height regulation and adaptation with regard to the remaining supporting legs (7).

Preferably, the stand further comprises a plurality of feet (11), each foot (11) being provided at an end of a corresponding supporting leg (7) and, preferably, being flat and arranged substantially in parallel with the fixed base (2), when the corresponding leg is in an open position. The feet (11) provide for a more stable positioning on a surface, as the contact area with such surface is increased. The feet (11) are jointly moved with the legs, as shown in FIGS. 1-4.

Specifically, and for each supporting leg:
a first end (14) of the distal section (13) is pivoted in an end the proximal section (12), and
a second end (15) of the distal section (13) is pivoted in an intermediate point of the proximal section (12), and
a foot (11) is pivotably connected to said first end (14) of the distal section (13). Thereby providing for height regulation and adaptation of the supporting legs (7), which is especially useful in irregular surfaces, typical of the outdoors.

Optionally, each supporting leg (7) is pivotable upon the fixed base (2) in a second end (15), such second end (15) having an extension with regard to the pivot that, when the supporting leg (7) is in a folded position and the corresponding blocking element in a blocking position, the second end (15) provides for support on a surface, the plurality of supporting legs (7) thereby supporting the stand on a surface, each second end (15) preferably being rounded. It provides for a better positioning of the folded stand—the legs are in a folded position—when put on a surface/the floor. The rounded second ends (15) provide steadier positioning.

The stand of the present invention may have a fixed seat (6) or a seat (6) able to be coupled to the arm (5). The seat (6) is not required for storage/transportation. Specifically, in such embodiment the stand comprises a seat (6) for a television camera operator able to be coupled to the arm (5) or definitively connected to the arm (5). The seat (6) may include a portion for a television camera operator to sit, a backrest and a bar connectable to the arm (5), as provided by the embodiments of FIGS. 1 and 2.

In another specific embodiment of the stand, combinable with any above described, it comprises an intermediate element (16) rotatable around the column (4), the arm (5) being fixed to such intermediate element (16), the intermediate element (16) preferably further comprising a counter-balance, such that the counter-balance promotes a balance with the weight of a television camera operator seated on a seat (6) connected to the arm (5), the intermediate element (16) preferably comprising a disk (17) which is rotatably connected to the column (4).

In another advantageous embodiment, the stand further comprises second means suitable for fixing a second seat (6) for a television camera operator, such second means suitable for fixing a second seat (6) being closer to the fixed base (2) than the arm (5). Such second means therefore provide for a second height for a seat (6) to be provided, lower than the height of the arm (5). A television camera operator may thus use the stand while seated closer to the ground. Preferably, the second means are arranged oppositely to the arm (5), with respect to the column (4).

In another inventive aspect of the stand of the present invention, it further comprises means for a television camera operator to stand, able to be coupled to a first side of the supporting legs (7) when such supporting legs (7) are in an open position, optionally the means for a television camera operator to stand consisting of a plurality of plates able to be coupled to said first side of each supporting leg, the plates preferably being formed by a grid. Such means for a television camera operator to stand, which may consist of a set of plates formed by a grid, provide for a better way for the operator to move around the column (4), considering that, otherwise, there would be a need to avoid the supporting legs (7), which are in the open position.

Optionally, each supporting leg (7) comprises a second cut-out, the second cut-out being provided in a distal half of the supporting leg (7) and being suitable for a fastening element such as a rope to be coupled, and thereby enable all the supporting legs (7) to be tightly bound together.

The elements of the stand, namely the arm (5), column (4), fixed base (2) and supporting legs (7) are preferably made of a metal, more preferably aluminium. It provides for lightness and resistance of a stand (1) which is frequently transported, thus folded and unfolded, and used in outdoors, subject to, for example, rain, wind, sunlight.

Optionally, the supporting legs (7) and, consequently, the corresponding slots (3) are between 5 and 8, preferably 6. Other amounts, if able to be provided in the fixed base (2), are also suitable.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A compact stand for a television camera comprising:
   a fixed base with a plurality of slots peripherally provided,
   a column suitable for connecting a television camera, such that the camera is rotatable around an axis of the column,
   an arm suitable for fixing a seat for a television camera operator and rotatable around the axis of the column, and
   a plurality of supporting legs, each being pivotable upon the fixed base, wherein each supporting leg is pivotable between:
   i. a folded position, in which each supporting leg is positioned so that each supporting leg is able to be coupled to a corresponding slot, and
   ii. an open position, in which each supporting leg is positioned substantially in parallel to the fixed base and thereby able to be placed on a surface.

2. A stand according to claim 1 further comprising blocking means suitable for blocking each of the supporting legs in the folded and/or in the open position, the blocking means being connected to the fixed base and pivotable between:
   a blocking position, in which the blocking means prevent pivotable movement of the supporting legs, and
   a released position, in which the supporting legs are able to perform pivotable movement.

3. A stand according to claim 2 wherein the blocking means comprise a set of blocking elements, each blocking element corresponding to a slot and a supporting leg, each blocking element being pivotable around an axis perpendicular to a pivoting axis of a corresponding supporting leg and provides blocking of the corresponding supporting leg in a corresponding folded position or open position and, preferably, the blocking elements are connected to each other so that they are jointly movable.

4. A stand according to claim 3 wherein each supporting leg comprises a cut-out, such cut-out being so arranged that, when such supporting leg is in a folded position, provides for coupling of corresponding blocking element, when such blocking element is in a blocking position.

5. A stand according to claim 3 wherein each supporting leg is so arranged in relation to the fixed base that, when in an open position, the corresponding blocking element, when pivoted into a blocking position, is between such supporting leg and the corresponding slot.

6. A stand according to claim 1 further comprising a plurality of feet, each foot being provided at an end of a corresponding supporting leg and, preferably, being flat and arranged substantially in parallel with the fixed base, when the corresponding supporting leg is in an open position.

7. A stand according to claim 6, wherein, for each supporting leg:
   a first end of a distal section is pivoted in an end of a proximal section, and
   a second end of the distal section is pivoted in an intermediate point of the distal section, and
   a foot is pivotably connected to said first end of the distal section.

8. A stand according to claim 1 wherein each supporting leg comprises a proximal section and a distal section, the two sections being pivotably wherein upon placement of the supporting legs on a surface in the open position, the angle between each distal section and corresponding proximal section is adaptable, providing regulation of distance between the proximal section and the surface.

9. A stand according to claim 1, wherein, for each supporting leg:
   a first end of the distal section is pivoted in an end the proximal section, and
   a second end of the distal section is pivoted in an intermediate point of the proximal section, and
   a foot is pivotably connected to said first end of the distal section.

10. A stand according to claim 1, wherein each supporting leg is pivotable upon the fixed base in a second end, such second end having an extension with regard to the pivotable supporting leg that, when the supporting leg is in a folded position and the corresponding blocking element in a blocking position, the second end provides for support on a surface, the plurality of supporting legs thereby supporting the stand on a surface, each second end preferably being rounded.

11. A stand according to claim 1 further comprising a seat for a television camera operator able to be coupled to the arm or definitively connected to the arm.

12. A stand according to claim 1 further comprising an intermediate element rotatable around the column, the arm being fixed to such intermediate element, the intermediate element further comprising a counter-balance, such that the counter-balance promotes a balance with weight of a television camera operator seated in a seat connected to the arm, the intermediate element preferably comprising a disk which is rotatably connected to the column.

13. A stand according to claim 1 further comprising second means suitable for fixing a second seat for a television camera operator, such second means suitable for fixing a second seat being closer to the fixed base than the arm.

14. A stand according to claim 1 further comprising means for a television camera operator to stand, able to be coupled to a first side of the supporting legs when such supporting legs are in an open position, optionally further consisting of a plurality of plates able to be coupled to said first side of each supporting leg, the plates preferably being formed by a grid.

15. A stand according to claim 1 wherein each supporting leg comprises a second cut-out, the second cut-out being provided in a distal half of the supporting leg and being suitable for a fastening element such as a rope to be coupled, and thereby enable all the supporting legs to be tightly bound together.

16. A stand according to claim 1 wherein the arm, column, fixed base and supporting legs are made of a metal, preferably aluminium.

* * * * *